United States Patent [19]
Garcia et al.

[11] Patent Number: 5,842,192
[45] Date of Patent: Nov. 24, 1998

[54] CONCURRENT DESIGN TRADEOFF ANALYSIS SYSTEM AND METHOD

[75] Inventors: Fred A. Garcia, Somerville, Mass.; Krishnan Srinivasan, Dallas, Tex.

[73] Assignee: Texas Instruments Incorporated, Dallas, Tex.

[21] Appl. No.: 457,251

[22] Filed: Sep. 22, 1995

Related U.S. Application Data

[63] Continuation of Ser. No. 927,543, Jul. 31, 1992.

[51] Int. Cl.$^6$ .................................................. G06F 15/18
[52] U.S. Cl. ............................. 706/45; 706/54; 706/919
[58] Field of Search .............................. 395/50, 51, 919, 395/77, 10; 706/54

[56] References Cited

U.S. PATENT DOCUMENTS

5,243,689   9/1993   Yoshiura et al. ........................ 706/54

OTHER PUBLICATIONS

D. Sriram, "All–Rise: A Case Study in Constraint–Based Design," Artificial Intelligence in Engineering, pp. 186–203, Dec. 1987.

E. Simoudis, "A Knowledge–Based System for the Evaluation and Redesign of Digital Circuit Networks," IEEE Trans. on Computer–Aided Design, vol. 8(3), pp. 302–315, Mar. 1989.

D. Hinkle, "Clavier: A Case Based Autoclave Loading Advisor," Lockheed Artificial Intelligence Center, 7 pages, Mar. 1990.

R. MacNeil, "Adaptive Perspectives: Case–Based REasoning with TYRO, the Graphic Designer's Apprentice," IEEE Workshop on Visual Languages, pp. 138–142, Oct. 1990.

D. Navinchandra et al., "Behavioral Synthesis in CADET, a Case–Based Design Tool," IEEE Conf. on Artificial Intelligence Applications, pp. 217–221, Feb. 1991.

T. Hinrichs and J. Kolodner, "The Roles of Adaptation in Case–Based Design," 1991 DARPA Workshop on Case–Based Reasoning, pp. 121–132, May 1991.

*Primary Examiner*—Robert W. Downs
*Attorney, Agent, or Firm*—Wade James Brady, III; W. Daniel Swayze, Jr.; Richard L. Donaldson

[57] ABSTRACT

Concurrent tradeoff analysis (10) first ascertains a set of constraints (16) and variables (18) for specifying a solution, and then defines characteristics for specifying the merit of the solution. Computations are made to determine the values for the variables (18) and characteristics, which represent a current solution state. The current solution state is checked (42) to ensure that there are no violations of the constraints (16). If a violation exists, one or more alternatives are generated (46) via a number of methods, and the alternatives are evaluated (48) along with the current solution state. One or more most promising alternative is chosen, and the process proceeds until values for all of the variables (18) and characteristics are computed.

19 Claims, 5 Drawing Sheets

CONCURRENT DESIGN TRADEOFF ANALYSIS SYSTEM AND METHOD

This is a continuation of application Ser. No. 07/927,543 filed Jul. 31, 1992.

NOTICE

COPYRIGHT© 1992 TEXAS INSTRUMENTS INCORPORATED

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD OF THE INVENTION

This invention relates in general to the field of computer aided engineering application software. More particularly, the present invention relates to a concurrent design tradeoff analysis system and method.

BACKGROUND OF THE INVENTION

The growth in complexity of design processes with technological advances has made it increasingly necessary to rely on Computer Aided Engineering (CAE) tools in the design process. However, conventional CAE tools are generally deficient due to their sequential engineering design approach. For example in conventional CAE tools, design representations are customized for a single area or domain of the product cycle. There also exists no well defined methodology for enforcing constraints among variables in different domains. In addition, conventional systems and methodology use a large quantity of incomplete information and non-linear constraints making it hard to choose proper values that satisfy all of the design constraints. Therefore, the conventional sequential design method neglects a large amount of significant information and constraints at early design stages, resulting in more design difficulty at later stages.

Accordingly, it has become desirable to provide a concurrent engineering approach in which expert knowledge from all domains are applied to solve design constraints in the design process. The expert knowledge is used to make tradeoff analysis in order to arrive at a satisfying design.

SUMMARY OF THE INVENTION

In accordance with the present invention, a concurrent design tradeoff analysis system and method is provided which substantially eliminate or reduce disadvantages and problems associated with prior systems and methods.

In one aspect of the present invention, concurrent tradeoff analysis first ascertains a set of constraints. It then defines variables for specifying a solution and characteristics for specifying the merit of the solution. Computations are made to determine the values for the variables and characteristics, which represent a current solution state. The current solution state is checked to ensure that there are no violations of the constraints. If a violation exists, one or more alternatives are generated via a number of methods, and the alternatives are evaluated along with the current solution state. One or more promising alternatives are chosen, and the process proceeds until values for all of the variables and characteristics are computed.

In another aspect of the present invention, a concurrent tradeoff analysis system includes a knowledge source having information of a predetermined knowledge domain. A designer receives a set of constraints, and computes values for a set of variables and characteristics representing a solution state in response to the constraints and information in the knowledge source. If a constraint is violated, a few alternatives are generated. All alternatives are evaluated and one or more alternatives are chosen. Each chosen alternative creates a solution state. Then all solution states are evaluated. One solution state is chosen for further design.

One important technical advantage of the present invention is the generic nature of the concurrent tradeoff analysis system and method. The knowledge and information in the knowledge source determines the expert domain of the system.

Another important technical advantage is the ability to apply a number of techniques to generate alternatives, including querying the user for input. The evaluator also utilizes a number of evaluation techniques and therefore provides a more accurate picture of the merit of the alternatives and solution states.

Yet another important technical advantage of the present invention is that the designing process has been changed from a sequential nature to a concurrent process to eliminate deficiencies in conventional systems and methodologies.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
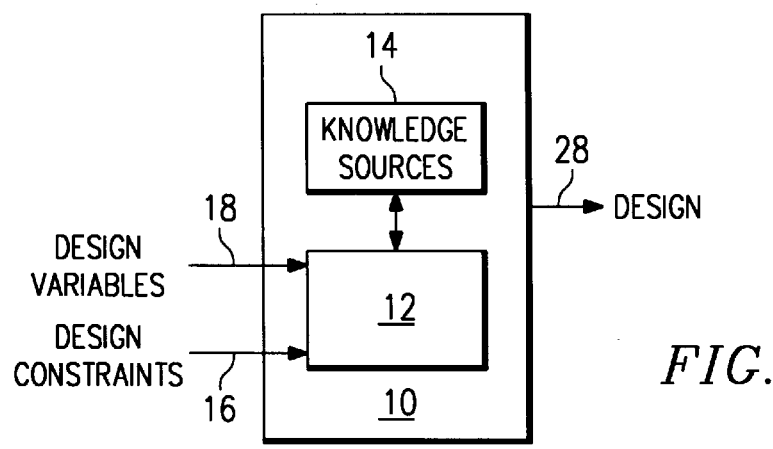
FIG. 1 is a greatly simplified block diagram of a preferred embodiment of the present invention.

The preferred embodiment of the present invention and its advantages are best understood by referring to the drawings, while like numerals are used for like and corresponding parts. With reference to the drawings, FIG. 1 is a greatly simplified block diagram of the concurrent design tradeoff analysis system and method, indicated generally at 10 and constructed according to the teaching of the present invention. Although system and method 10 is primarily concerned with assisting designers to make tradeoff decisions encountered in the course of product design, it is applicable to any decision making situation in which any number of choices are more or less equally feasible but which lead to different outcomes. Tradeoff analysis system 10 is preferably constructed such that it comprises two basic modular portions: an analyst module 12 and a knowledge sources module 14. Configured in this manner, tradeoff analysis system 10 remains a generic system with its domain determined by the information contents of changeable knowledge sources 14.

The inputs to tradeoff analysis system 10 are design constraints 16 and design variables 18. Design constraints 16 include those characteristics of the resultant product that are desirable. Examples of design constraints 16 may be that the physical dimensions of the product not exceed certain parameters, the desirable operating parameters of the product, the cost of manufacturing not exceed a specific amount, and safety requirements. Design constraints 16 may also include manufacturing constraints such as scheduling requirements of certain machines, and any other operating or resources requirements and limitations of the manufacturing equipment.

Design variables 18, on the other hand, are attributes of the product which, taken together, completely and uniquely specify the design or product. Examples of design variables 18 of a semiconductor integrated circuit design are the fabrication process, what semiconductor technology, a specification of the physical layers, its device components, its physical layout, etc. It is possible for the domain of the design to encompass only a small portion of the entire process, such as the physical layout or logic design of the integrated circuit, or it could involve the entire design process from conception to fabrication.

Design characteristics are a function of design variables 18 and constraints 16. Design characteristics do not specify a design but help to evaluate it. For example, a design characteristic may be its cost, reliability, utility, etc. as measured by some predetermined function. This relationship between design characteristics and design variables 18 depends upon the domain models used in knowledge sources 14. The user or designer can define as many design characteristics as he or she wishes so long it is desirable and feasible.

Figure 2:
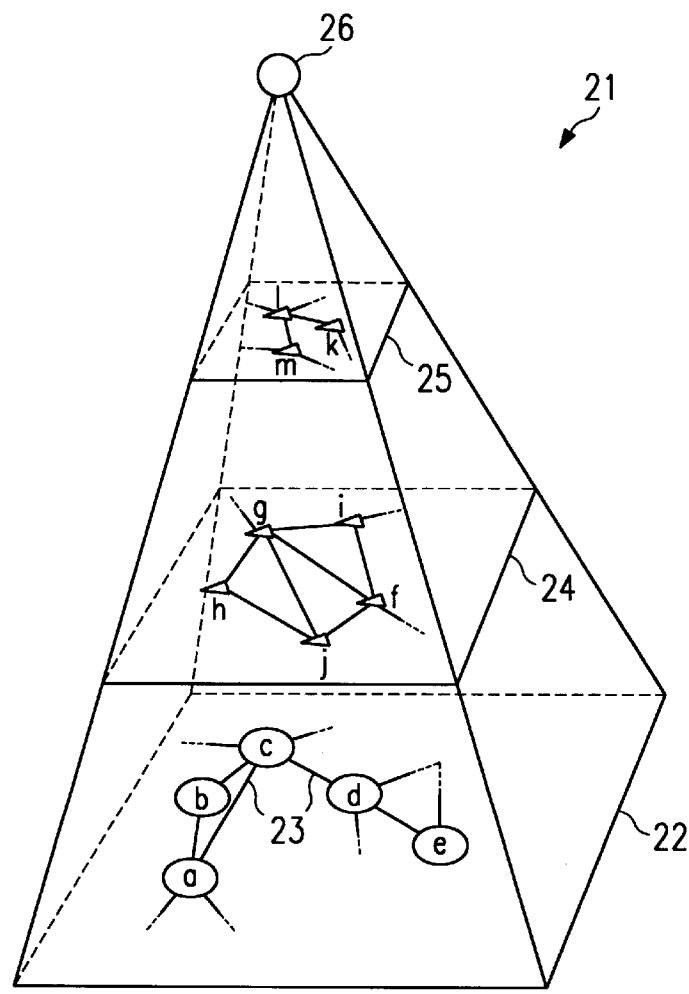
FIG. 2 is a diagram illustrating the hierarchy of tradeoff analysis layers.

Referring to FIG. 2, a conceptual hierarchical pyramid 21 may be formed where design variables a–e are at a base layer 22 and linked by their constraint relationships 23. Design characteristics h–k and l–n can be defined in multiple levels of abstraction 24 and 25, for example, with the characteristics in each level being a function of those immediately below it. For example, the total cost of a product is a function of the its component manufacturing cost and its assembly cost. The evaluation of the overall final design is a design characteristic 26 at the top of the pyramid. Therefore, tradeoff analysis may be performed at any level of abstraction to resolve constraint violations by choosing "satisficing" values for the attributes. Satisficing is defined as a value which has been chosen to satisfy the constraints 16 while maintaining it as "optimal" as possible, but without guaranteeing that it is the "optimal" value. Therefore, the output of tradeoff analysis system 10, as shown in FIG. 1, is a resultant design 28 which is satisficing. Design variables 18 and design characteristics are sometimes collectively referred to as design attributes in the discussions below.

Figure 3:
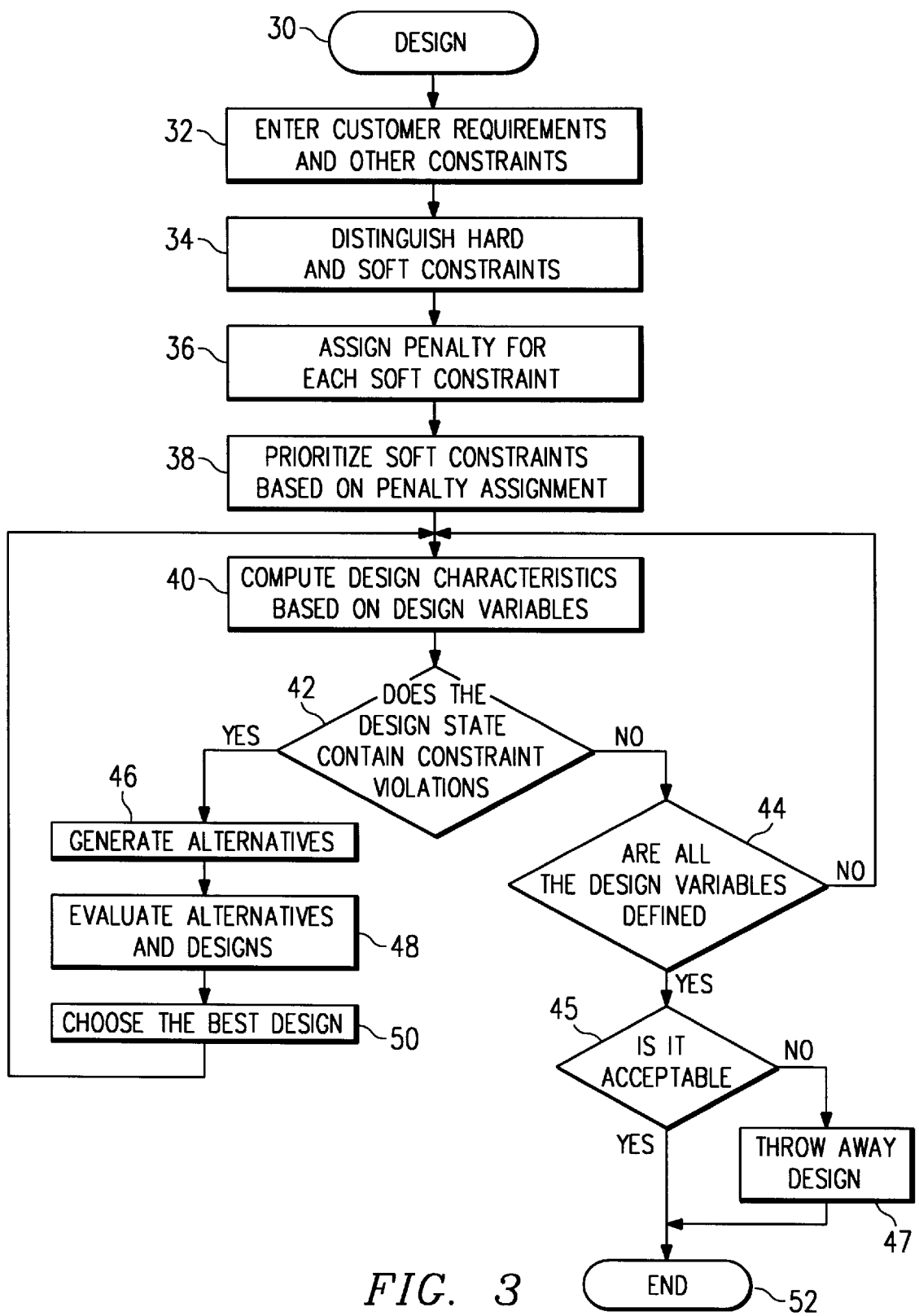
FIG. 3 is a simplified flowchart of the preferred embodiment of the instant invention.

Referring to FIG. 3, a simplified flowchart of a preferred sequence of steps of the design and analysis process 30 is shown. Design constraints 16 such as customer requirements and other constraints are first entered into system 10, as shown in block 32. According to customer and management input, the constraints 16 are sorted into hard and soft constraints, as shown in block 34. Hard constraints are those which cannot be violated and soft constraints are those which can be violated. As shown in blocks 36 and 38, a penalty value is assigned to each soft constraint if it is violated and the soft constraints are prioritized accordingly.

Given design constraints 16 and a definition of design variables 18, the designing process comprises the determination of values and specifications to satisfy design variables 18. At any instant of development, an intermediate design state is achieved with a subset of design variables 18, and consequently a subset of design characteristics, determined. A predetermined set of design characteristics are computed for each design state, as shown in block 40. As discussed above, the design characteristics computation involves the knowledge and information in knowledge sources 14 (FIG. 1). As shown in block 42, at each design state, the computed variables and characteristics are evaluated to determine whether any of the hard and soft constraints are violated. If no constraints are violated, a determination is made as to whether all of the design variables 18 have been defined, which signifies the completion of the design process. If there are constraint violations, those design states with any hard constraint violation is disregarded. However, if any soft constraint is violated, alternatives are generated, as shown in block 46. Thereafter in blocks 48 and 50, any current designs and alternatives are evaluated, and the best or satisficing design is chosen. This process is repeated, from blocks 40 to 50, until the condition in block 44 is satisfied. If all the design variables are defined, then a determination is made as to whether it is acceptable, as in block 45. If it is not acceptable, then the design is discarded, as shown in block 47. The design and analysis process terminates in block 52.

By way of illustration, let a customer constraint, which has been categorized as a soft constraint, specify that the cost of a product X should not exceed ten dollars. The design development process arrived at a design state in which the material of a particular component Y of product X, a design variable 18, has been defined as steel. By accessing the knowledge and information in knowledge sources 14, the cost design characteristics of product X has been computed to be twenty dollars. Therefore, the design state at this instant violates a soft constraint. Alternatives are sought which attempts to satisfy or better satisfy all of the constraints. The alternatives could suggest a different material, such as aluminum, for component Y, or a different manufacturing process, or even a different manufacturing facility in order to lower the cost.

Figure 4:
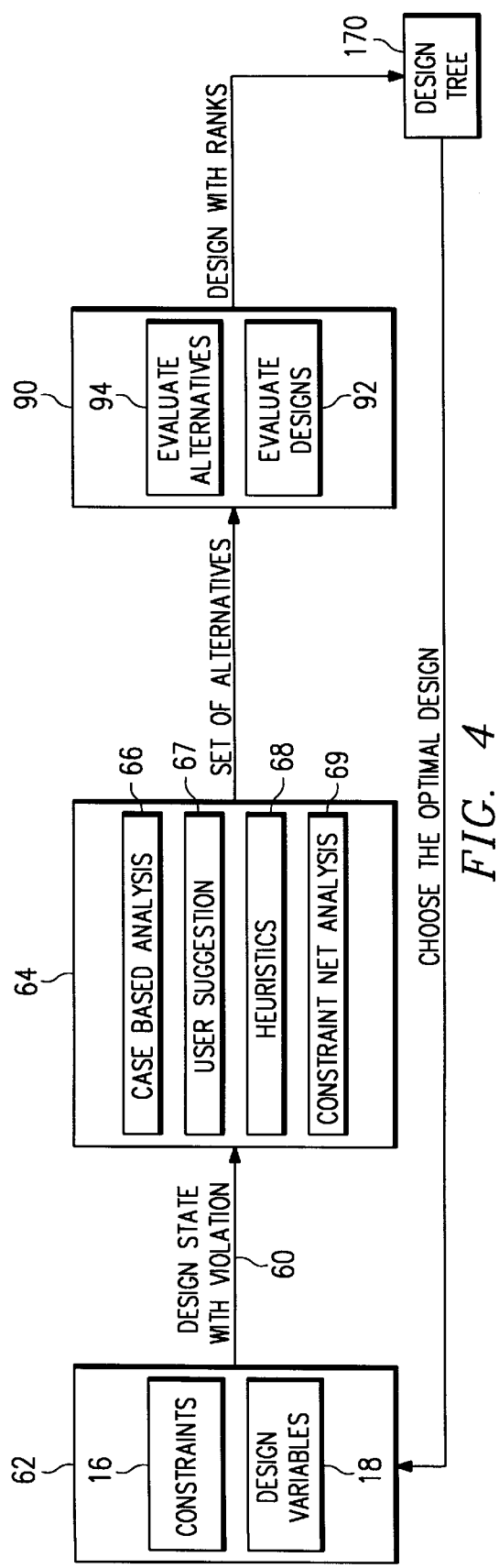
FIG. 4 is a simplified block diagram of the preferred embodiment of the invention.

Referring to FIG. 4, a flow diagram illustrates the various methods used to generate the alternatives. A design state 60 which violated a constraint is derived from design development 62, as discussed above. A preferred embodiment of an alternative generator 64 presently uses case based analysis 66, user suggestions 67, heuristics 68, and constraint net analysis 69 methods to derive alternatives for the current design state 60 and the given design constraints 16 and design variables 18.

To perform case based analysis or reasoning 66, it is necessary to have a case library (not shown) storing and maintaining previous designs and alternatives. Case based analysis 66 uses a method for quickly determining which appropriate cases to pursue in a given situation. The case library, which simply stores information from previous design sessions in a known manner, includes the designs and alternatives that were previously considered and their evaluation results. A previous session is only stored in the case library, if at least one satisficing designed was identified in it.

The evaluation of designs in the case library depends heavily on the values that are supplied for evaluation parameters such as importance, utility curves, resource allocation table, etc. Thus, it is important that these values be chosen carefully. Analyzing the values that were used in previous successful designs is one method which can be used to adjust these evaluation parameters. The salient attributes which are used to determine which of the cases in the library are relevant are the long term goals and the customer requirements.

A search is made through the library for all cases having the same long term goals whose hard constraints satisfy the hard constraints of the current design. The long term goal method of evaluating designs is discussed in more detail below in conjunction with FIG. 6. The parameters from all the cases are averaged with the current parameters to produce a new proposed set of values. Currently, no effort is made to give greater importance to those parameters which might have been more "successful" in helping the user arrive at a satisficing design. However, a weighting function may be used to accomplish this task if deemed desirable.

Since concurrent tradeoff analysis system and method 10 is meant to be a tool to assist the user, it is important to allow the user to suggest alternatives to further the design. User suggestion module and method 67 permits this possibility of generating alternatives. A third method permits the application of conventional heuristics methods 68, such as rule-based reasoning, for generating alternatives. The knowledge required for heuristics 68 may be stored in knowledge sources 14.

Figure 5:
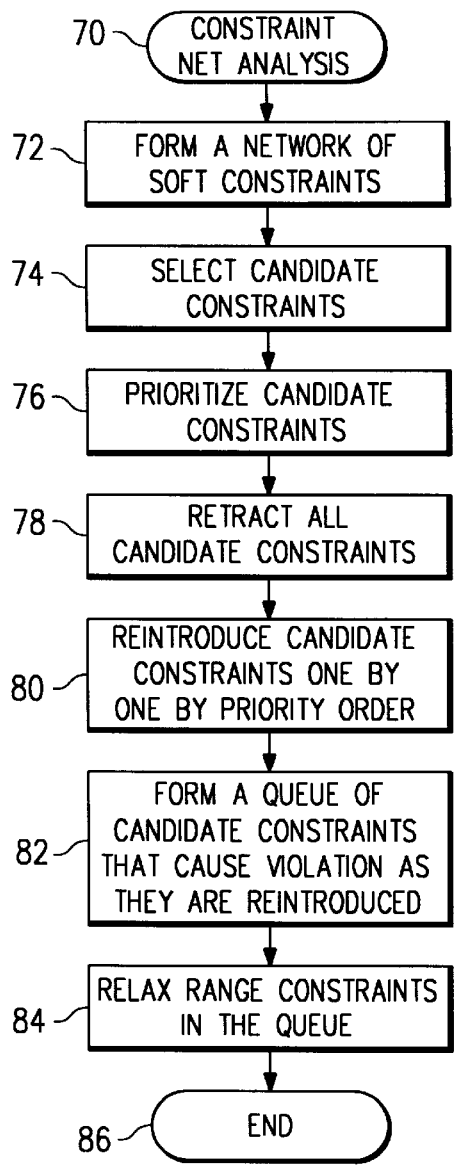
FIG. 5 is a simplified flowchart of the constraint net analysis method of generating alternatives.

Constraint net analysis 69 is a method used to identify a set of soft constraints that can be relaxed to resolve the inconsistencies in the design state 60. Referring to FIG. 5, a simplified flowchart for a preferred embodiment of a constraint net analysis algorithm 70 is shown. In order to find a set of soft constraints that can be relaxed so as to resolve the inconsistencies in the design state 60, algorithm 70 first generates a network (not shown) of soft constraints, as shown in block 72. In the network, each soft constraint is represented as a node and connections are established between those nodes that share at least one common constraint symbol. For example, if A<(width*5) and B<(width+length), width is a common constraint symbol shared by soft constraints A and B. Thus exists a connectivity between nodes A and B in the network. Constructed in this manner, the neighbors of a constraint in the network are those whose satisfiability are most likely affected by any alteration of the constraint. The distance d between two nodes in this network is defined as the minimum number of nodes that must be traversed in order to arrive at one node from the other, and the connectivity between two nodes is defined as the number of non-cyclic paths between them not containing more than d nodes.

Candidate constraints are then selected, as shown in block 74. The candidate constraints consist of the "offending" constraint whose introduction caused the inconsistency in the design state, as well as the set of all constraints whose connectivity to the offender is at least d!, where d is the distance to the offender. Accordingly, the set of candidate constraints include more than just those constraints that are "adjacent" to the offender, but also those constraints that are farther away if they have a sufficiently large impact on the offender.

Once the set of candidate constraints is selected, they are prioritized so that the set of constraints selected for modification have lower priorities, as shown in block 76. Higher priority is assigned to those constraints that will have higher impact on the design. The impact of a constraint is defined as being the number of design characteristics that are either constraint symbols or characteristics that are functions of one or more constraint symbols.

By prioritizing the candidate constraints based on impact, the effect of these changes on the characteristics of the design state is minimized. This is desirable since a large impact on the design characteristics could undo work that has been performed so far. Of course, a designer may still purposefully explore a "drastic" alternative in hopes of arriving at a state from which will lead to a "good" design. Impact is only used for arriving at a preliminary ranking presented display to the user who then has the option of altering the priorities assigned to the candidate constraints.

Once priorities have been assigned, a set of constraints to be modified are selected. This is done by first retracting all the candidate constraints as shown in block 78, and reintroducing them by priority order, as shown in block 80. In block 82, a queue is formed and maintained of all the constraints which created a violation as they were reintroduced, and the constraints that are members of this queue are the set of constraints to be relaxed.

Referring to block 84, for the purpose of relaxing constraints, the soft constraints are classified as being either relational constraints or range constraints. A range constraint involves only one constraint symbol and expresses a range of values for the constraint symbol. An example of a range constraint is temperature $\leq 500°$ C. Relational constraints, on the other hand, express relations among attributes and are characterized by more than one constraint symbol (i.e. $a \geq b+c$). A range constraint that creates a violation is relaxed by determining a new range for the constraint symbol or design variable 18 after all the other candidate constraints have been re-introduced. A relational constraint is therefore simply retracted from the selection of candidate constraints. The collection of relaxed constraints then gathered to generate an alternative.

All the alternatives generated by alternative generator 64 are evaluated by an evaluator 90, shown in FIG. 4. Evaluator 90 is used to rank both the set of active designs 92 as well as the set of proposed alternatives 94 that are generated by alternative generator 64 when violations are found in a design state. In each of these cases, this ranking serves two purposes: eliminating "bad" choices and assisting in the selection of the "more promising" choices to expand. The overall evaluation $\psi$ is defined as a function of various criteria used for performing tradeoffs, and for defining these criteria in terms of the evaluations performed by the various evaluation modules of the alternative or design evaluator blocks.

Figure 6:
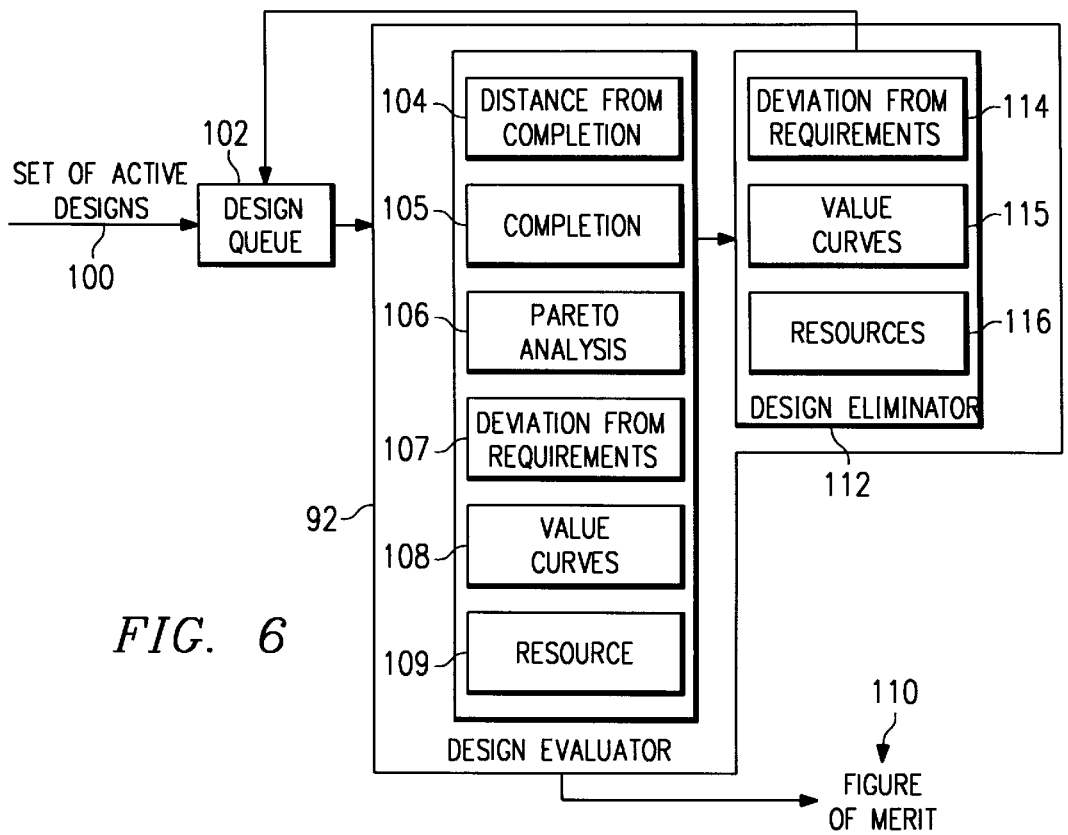
FIG. 6 is a block diagram of the preferred embodiment of the design evaluator.

Referring to FIG. 6, design evaluator 92 receives and evaluates active designs 100 maintained in a design queue 102. In the preferred embodiment of the instant invention, six design evaluation modules and methods are employed: distance from completion 104, completion 105, pareto analysis 106, deviation from requirement 107, value curves 108, and resource 109.

Distance from Completion 104 provides an estimate of the number of computational steps required to complete a design. Distance from completion 104, as its name suggests, is a measure of how much more work remains to be done to complete a design. Given a design state 60 with violations, $v_1, \ldots v_n$, the formula used to compute distance from completion is:

$$\sum_{i=1}^{n} d_i + \mu \qquad (1)$$

where $\mu$ is the number of unspecified design variables 18 and $d_i$ is the minimum number of design attributes that need to be changed in order to resolve $v_i$. Formula (1) computes an underestimate of the number of computational steps necessary to complete the design, since it assumes that the alternatives pursued to overcome constraint violations will not contradict each other or create new violations. The number of unspecified design characteristics is not counted, since once all the design variables are specified, all the design characteristics are defined as well. The output of distance from completion 104 is a ranked list of design states.

Completion 105 is a measure of how complete the current design is. In other words, complete 105 computes how much progress has been made in specifying the design. Complete 105 is essentially a count of the number of design attributes which have been defined or assigned without creating any violation. The formula used for completion is:

$$\Sigma X^{l+v} \qquad (2)$$

where X is a design characteristic which has been defined without violating any constraints and l is its importance. v is simply the number of design variables 18 which have been defined. Thus, formula (2) counts the number of design attributes which are defined, where the design characteristics are weighted based on their importance. Formula (2) is based on the observation that a design state with the more important design characteristics defined is more "complete" than one which has defined an equal number of less important design characteristics. It is possible to compute a priori the value for a complete design, which is defined as the maximum limit for this computation. Thus, the percentage of completion for a design can be obtained by dividing the result of formula (2) by the maximum limit. Completion 105 outputs a list of ranked designs based on their percentage of completion.

Pareto analysis module 106 uses known Pareto methods to determine which designs make more preferable tradeoffs among characteristics. Pareto analysis 106 is used to determine the Pareto optimality of a set of design states. The user is first queried to inquire which two design characteristics are of interest in a comparison to see what the tradeoffs between them are. For each such pair, the user will be shown a Pareto curve of the tradeoff between the chosen design characteristics and is asked to rank the designs based thereon. The rankings obtained from the user from each such pair is combined in order to arrive at an overall ranking of the designs, which is the output of pareto analysis 106.

Figure 7:
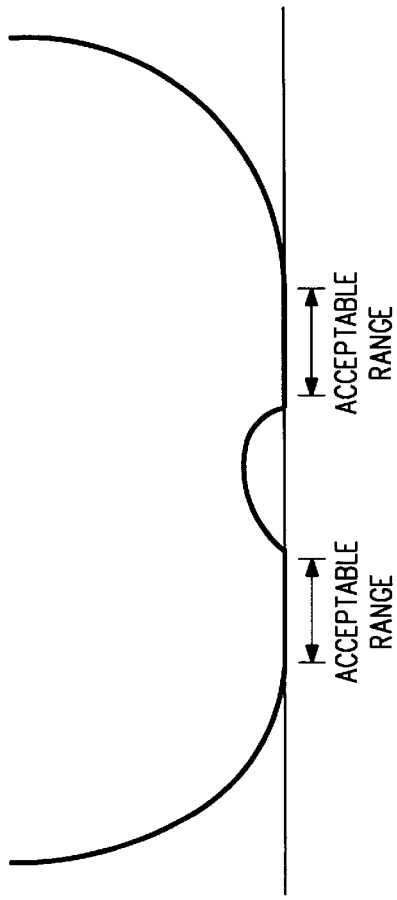
FIG. 7 is an example of a penalty curve used in the preferred embodiment of the present invention.

Deviation from Requirements module 107 is a measure of how far a design state deviates from the customer requirements and constraints which were originally specified. One way of performing this function is to assign penalty units per unit of deviation for each design attribute and sum the penalty units. However, a non-linear penalty function may be desirable for certain design attributes. Thus, a penalty function for each design attribute can be formulated and included in an evaluation parameters file (not shown). The penalty function preferably specifies a number of ranges with a polynomial for computing the penalty for each range. Certain restrictions are applicable to the penalty functions. The penalty function is always positive. Obviously, the ranges cannot intersect any allowable range for the variable. The penalty function should increase as deviation increases. Thus, the slope of the functions for all ranges below the lowest acceptable range for an attribute should be negative, and the slope of the functions for all ranges above the highest acceptable range should be positive. For example, a possible deviation curve is shown in FIG. 7. To evaluate a design state, the penalties assigned by each penalty function are averaged and the designs are then ranked based on which have the lowest penalties.

Value curves module 108 provides a way to obtain an overall evaluation of a design based on previously defined utility curves for the design characteristics. In addition to defining the importance of each design characteristic, an utility curve is also defined. The utility curve is represented by pairs of integers and values. These integer-value pairs are converted into a normalized curve of values between 0 and 100 over the range of the integers specified by using a known least-squares fit algorithm. The utility curve assigns a number from 0 to 100 indicating the "utility" or "goodness" of a design characteristic given a value for that characteristic which is within the given range.

In order to evaluate a design state, value curves module 108 computes the utility value for each design characteristic defined in the design state, and then averages these values, weighted by the importance of the design characteristics, to obtain an overall rating for the design between 0 and 100. Value curves 108 outputs a ranked list of active design states and their ratings.

Resource Allocation module 109 measures how efficient a design state is in its use of resources. Resources are elements allocated for a design and are available in only a finite amount. Some examples of resources are material required, man/hours and capital approved for a project, etc. Resources are preferably stored as design characteristics and the limits on resource use are constraints on those characteristics. Since resources are, by assumption, scarce elements that can only be allocated in finite amounts, constraints upon resources are generally hard constraints.

Resource allocation module 109 determines how efficiently a design state uses resources and ranks design states that use resources more efficiently higher. It predicts the amount of each resource a design is expected to consume as a function of how complete the design is. A resource allocation table (not shown) is preferably used to record what percentage of each resource is expected to be used in defining each design variable 18. The resource allocation module 109 adds up the percentages and compares them with the computed percentage of actual consumption of resources. This comparison serves as the basis for identifying which designs are making inefficient use of resources.

From the outputs of modules 104–109, a figure of merit 110 is computed. Figure of merit 110 is therefore a function of the evaluations performed in modules 104–109, which are, respectively, a design's distance from completion, how complete the design is, pareto tradeoff analysis of a design's design characteristics, a design's deviation from requirements, design characteristics value curves, and resource consumption by a design. Figure of merit 110 may be computed in a number of ways that equally reflect its dependence on the evaluations. Preferably, figure of merit 110 is computed by normalizing the outputs from modules 104–109 and obtaining a weighted average or sum thereof. The weights for each output may be used to reflect the importance that a customer or management regards the results of the evaluations.

A minimal threshold figure of merit rating is assigned to a design by design evaluator 92 once it is complete. This reflects the fact that a "bad" complete design is still better than a "good" incomplete design. Once the "good" design is successfully completed, it is assigned a higher figure of merit rating than the "bad" complete design. Thus, there is another threshold, higher than the one for completeness, which indicates that a design is satisficing. Only satisficing designs are assigned ratings above this higher threshold. Therefore, a set of "satisficing requirements" must be specified by the user to determine when a satisficing design has been arrived at, and these requirements must be consistent with the hard requirements identified at the beginning of the design process.

Some undesirable designs are also eliminated by design evaluator 92. The elimination is performed primarily based on the evaluations performed by deviation from requirements 107, value curves 108 and resources 109 modules. For the purpose of illustration, the elimination function of modules 107–109 has been depicted as design eliminator 112 having three components 114–116 in FIG. 6.

Deviation from requirement 114 proposes a set of designs states for elimination from further considerations. It establishes a deviation threshold which separates those designs that muster under this evaluation method and those which deviate too far from the constraints. The results from value curves 115 is also used to identify those design states which do not merit further consideration. The design states to be eliminated are those which ranked low in the output of module 108. A predetermined cutoff threshold may be employed. Resources module 112 further recommends the elimination of those design states whose use of one or more resource exceeds the limit on the resource. The design states proposed for elimination may be presented to the user for an ultimate decision, or design eliminator 112 may be configured so that it eliminates the proposed design states automatically. As shown in FIG. 6, the set of design states remaining after the elimination round reenters design queue 102 for further evaluations.

Figure 8:
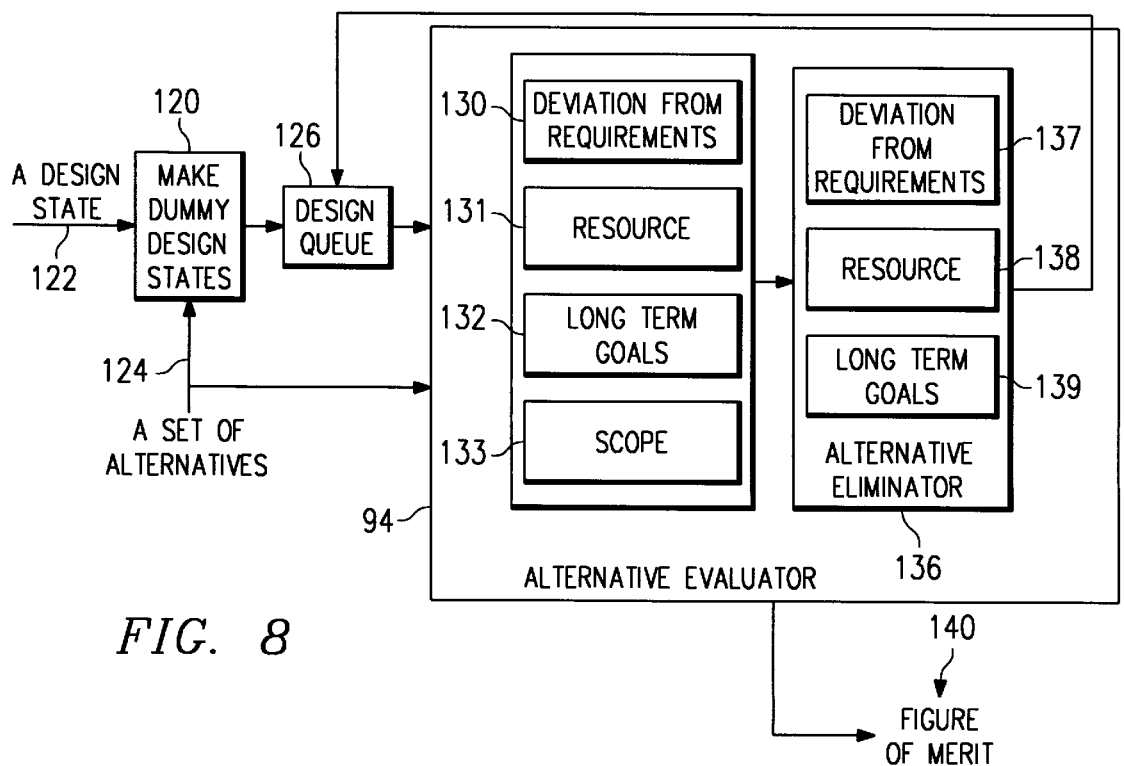
FIG. 8 is a block diagram of the preferred embodiment of the alternatives evaluator.

The alternatives generated by alternatives generator 64 (FIG. 4) are also evaluated in a similar manner. Referring to FIG. 8, dummy design states are generated 120 from a design state 122 and a set of alternatives 124. The dummy design states enter a design queue 126 and are evaluated in an orderly fashion. Alternative evaluator 94 employs four modules or methods: deviation from requirement 130, resources 131, long term goals 132, and scope 133 to perform the evaluation and alternative eliminator 136 employs deviation from requirement 137, resources 138 and long term goals 139 to eliminate undesirable alternatives. Deviation from requirement and resources modules 130 and 131, respectively, are the same as that of design evaluator 92, discussed above. In addition, the elimination function of deviation from requirements 130 and resources 138 in alternative eliminator are substantially the same as that of design eliminator 112.

Figure 9:
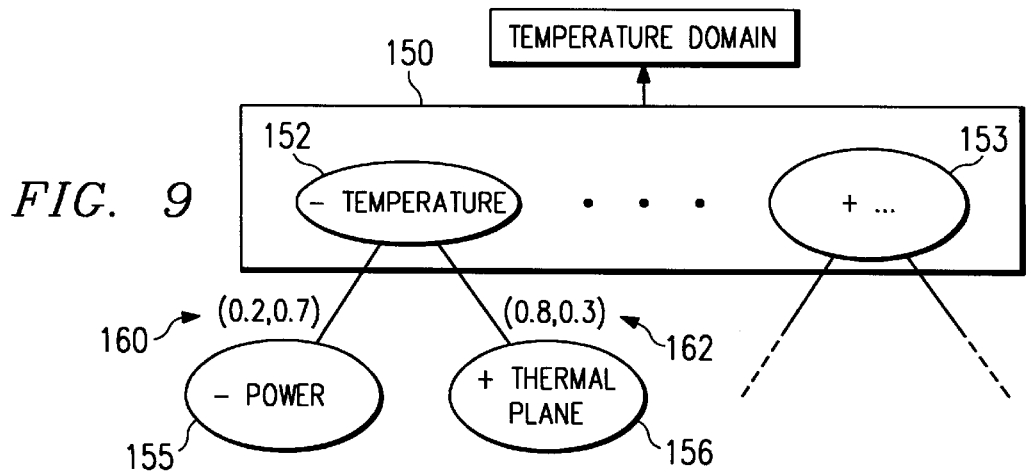
FIG. 9 is a diagram illustrating a long term goal tree used in the preferred embodiment of the present invention.

Goal planning is an important part of the design process. When an alternative, which specifies one or more changes to a design state, is proposed, it is evaluated based on how it contributes to the long term goals for the design. Referring to FIG. 9, the long term goals may be represented by a set of goal trees 150, where a root node 152–153 is the long term goals of the design and the child nodes 155–156 are the subgoals that contribute to the root goal. Long term goals nodes 152–153 are defined and assigned by the domain experts and specified in a domain file (not shown) preferably as part of knowledge sources 14. The domain files express what it is the expert is trying to achieve in the design. The positive and negative signs in each node indicates whether it is generally desirable to increase or decrease, respectively, the attribute associated with that node. In addition, knowledge sources 14 has the information on the impact of increasing or decreasing a particular attribute on another related attribute. The levels in the goal trees are thus analogous to the layers of abstraction shown in FIG. 2.

Long term goals module 132 first checks whether any of the components of the alternative match any of the nodes in the goal tree. For example, does the alternative raise or lower an attribute that has the effect of contributing to a long term goal? If an alternative does not contribute to any long term goal, it is eliminated, as indicated by module 139 in alternative eliminator 136. If the alternative contributes to one or more long term goals, one or more justification paths (not shown) is added to the alternative for each goal that it contributes to. A justification path specifies the path along the goal tree from the node that was matched by a component of the alternative to the goal. This justification path can be used to "explain" to the user how an alternative contributes to a long term goal.

Long term goal module 132 must also evaluate the extent to which alternatives that are not eliminated contribute to the long term goals. This is done by using contribution values 160–162 associated with each edge of the goal trees. Each edge is associated with an ordered set of two numbers having values between 0 and 1. The first number in the ordered set represents a positive contribution value assessing the percentage of contribution made by a change towards the goal, while the second number represents a negative contribution value assessing the percentage of "damage" that a change in the wrong direction causes. Since making positive contribution in all the subgoals has the effect of making a maximal contribution towards a goal, and likewise making negative contribution to all the subgoals has a maximal detrimental effect on achieving a goal, a property of the contribution values is that the sum of the negative contribution values of all edges leading out of a node is one and, similarly, the sum of the positive contribution values of these edges is one.

Thus, to evaluate an alternative, all the nodes that the alternative affects in the goal trees, whether positively or negatively, are identified. For nodes that make negative contributions, the negative contribution values along the path up to the root node are multiplied and added. This value is then subtracted from the sum of the products of the positive contribution values along the justification paths. A contribution value is therefore computed for each of the long term goals, and these are combined according to the importance of each long term goal to arrive at a ranking of alternatives based on their contribution to the long term goals.

Scope 133 in alternative evaluator 94 gives the user an idea of the extent towards which an alternative accomplishes the task at hand. Thus, scope module 133 simply counts what percentage of the violations in a design state are addressed by an alternative. The module outputs a ranked list of alternatives with preference given to those with higher scope.

Resources 138 is used to eliminate proposed alternatives in a similar manner as that of design eliminator 112, as discussed above.

Figure 10:
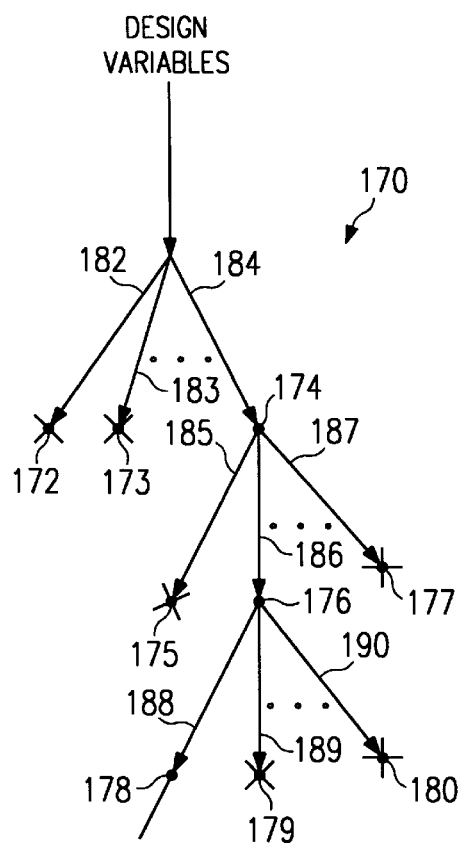
FIG. 10 is a representation of a tree data structure formed by the A* algorithm.

Returning to FIG. 4, the ranked designs from evaluator 90 is stored and maintained in a data structure or design tree 170, also shown in FIG. 10. Design tree 170 comprises of nodes 172–180 representing design states and directed edges 182–190 representing design alternatives. Preferably, only the single most promising design 174, 176 and 178, as determined by evaluator 90, is pursued at any level in design tree 170 pursuant to the known A* algorithm. However, design tree 170 preserves those designs and alternatives currently not under consideration so that all is not lost when the most promising design at a stage led the designing process down a dead end street. The designing process continues, as illustrated in FIG. 4, until the design is complete and a satisficing design is formulated.

Although the present invention has been described in detail, it should be understood that various changes, substitutions and alterations can be made thereto without departing from the spirit and scope of the present invention as defined by the appended claims.

What is claimed is:

1. A method for tradeoff analysis, comprising the steps of:

ascertaining a set of constraints;

sorting said set of constraints into hard constraints and soft constraints;

defining a set of variables for specifying a solution;

defining a set of characteristics for specifying the merit of said solution;

computing values for said set of variables and said sets of characteristics representing a current solution state;

comparing said computed values of said variables and said characteristics with said constraints;

generating at least one alternative to said current solution state in response to at least one of said variable and characteristics being inconsistent with said constraints;

evaluating said current solution state and alternatives; and choosing a satisficing solution to satisfy all of said constraints in response to said evaluating step, wherein said alternatives generating step comprises the step of querying a case library storing historic solution states and alternatives for an alternative specifying a value for at least one variable producing characteristics consistent with said constraints.

2. A system for concurrent tradeoff analysis, comprising:

(a) a knowledge source having information of a predetermined knowledge domain;

(b) a developer for receiving a set of constraints and receiving said information from said knowledge source to compute values for a set of variables and characteristics representing a solution state in response to said constraints and information from said knowledge source and sorting said set of constraints into hard constraints and soft constraints;

(c) an alternative generator for generating a set of at least one alternative from alternatives to said solution state in response to said computed values and characteristics being inconsistent with said constraints; and (d) an evaluator for evaluating said set of solution states and alternatives, ranking said solution states and alternatives in response to said evaluation and selecting a most promising solution.

3. The system, as set forth in claim 2, wherein said soft constraints are prioritized.

4. The system as set forth in claim 3, wherein said alternative generator assigns a penalty to each of said soft constraints; and prioritizes said soft constraints in accordance with said assigned penalty.

5. The system as set forth in claim 4, wherein said evaluator uses said penalties and priorities assigned to said soft constraints.

6. The system, as set forth in claim 2, wherein said alternative generator selects at least one constraint;

relaxes said selected constraints;

forming an alternative specifying a value for at least one variable producing characteristics consistent with said relaxed constraints.

7. The system, as set forth in claim 2, wherein said evaluator further evaluates said current solution state and said alternatives to eliminate unpromising current solution states and alternatives.

8. The system, as set forth in claim 2, wherein said evaluator computes a distance from completion for each current solution state in response to a figure of merit.

9. The system, as set forth in claim 2, wherein said evaluator computes a degree of completion for each current solution state in response to a figure of merit.

10. The system, as set forth in claim 2, wherein said evaluator applies a pareto analysis to each current solution state.

11. The system, as set forth in claim 2, wherein said evaluator determines how much each current solution state and alternative has deviated from said set of constraints.

12. The system, as set forth in claim 2, wherein said evaluator determines resource requirements of each current solution state and alternative.

13. The system as set forth in claim 2, further including an eliminator which determines resource requirements of each solution state and eliminates those solution states requiring resources exceeding their availability.

14. The system as set forth in claim 2, further comprising a tree structure for maintaining said most promising solution and said alternatives in a tree data structure.

15. The system, as set forth in claim 2, wherein said alternative generator queries a user for alternatives.

16. The system, as set forth in claim 2, further comprising a case library storing historic solutions and alternatives, said alternative generator consulting said case library for alternatives.

17. The system, as set forth in claim 2, wherein said alternative generator further selects at least one constraint, relaxes said selected constraints, and produces an alternative specifying a value for at least one variable producing characteristics consistent with said relaxed constraints.

18. The system, as set forth in claim 2, wherein said evaluator further comprises:

a solution state evaluator for applying at least one evaluation technique and computing a figure of merit for each solution state;

a solution state eliminator for applying at least one elimination technique and eliminating a solution state in response to said computed figure of merit;

an alternative evaluator for applying at least one evaluation technique and computing a figure of merit for each alternative; and an alternative eliminator for applying at least one elimination technique and eliminating an alternative in response to computed figure of merit, wherein said solution state evaluator further comprises an evaluation module for computing a distance from completion for each solution state.

19. The system, as set forth in claim 2, wherein said evaluator further comprises:

a solution state evaluator for applying at least one evaluation technique and computing a figure of merit for each solution state;

a solution state eliminator for applying at least one elimination technique and eliminating a solution state in response to said computed figure of merit;

an alternative evaluator for applying at least one evaluation technique and computing a figure of merit for each alternative; and an alternative eliminator for applying at least one elimination technique and eliminating an alternative in response to computed figure of merit, wherein said solution state evaluator further comprises an evaluation module for computing the degree of completion for each solution state.

* * * * *